June 5, 1962  R. L. ESSON ET AL  3,037,869
PROCESS FOR PACKING COMESTIBLES IN A THIN WALLED METAL TUBE
Filed Dec. 31, 1958
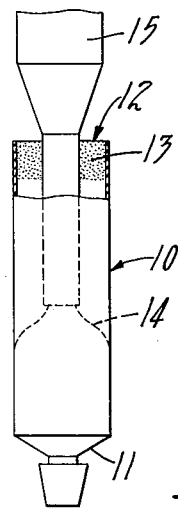
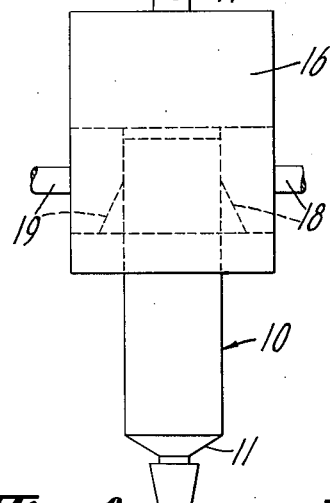
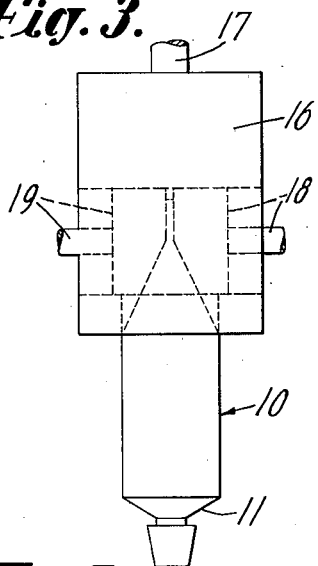
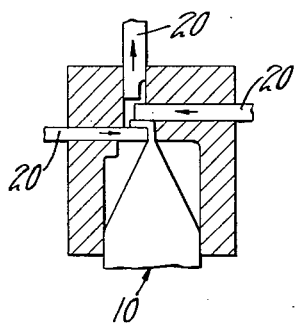
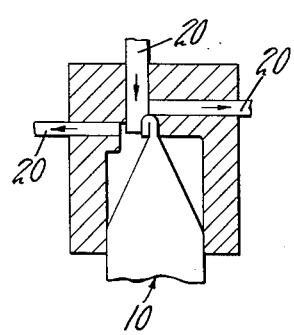
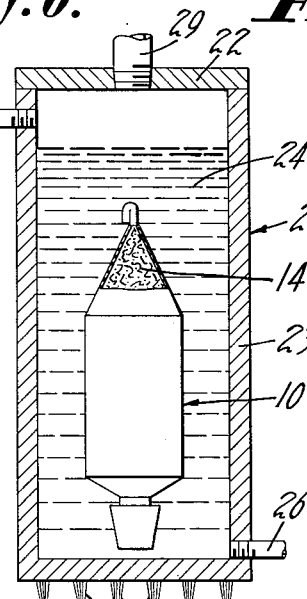
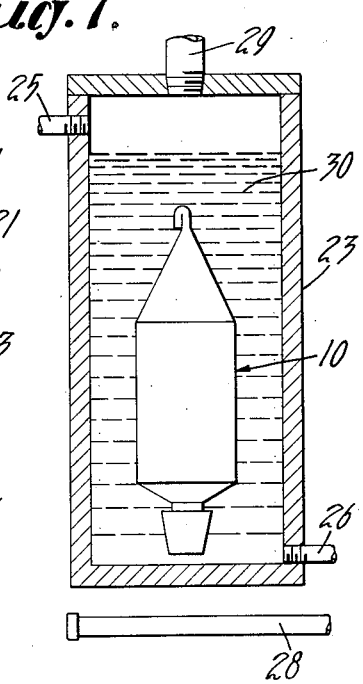
INVENTORS.
ROGER LAWRENCE ESSON
GORDON HEINRICH McDONNEL
BY Robert P. Auber
George W. Auber
ATTORNEYS

United States Patent Office 3,037,869
Patented June 5, 1962

3,037,869
PROCESS FOR PACKING COMESTIBLES IN A THIN WALLED METAL TUBE
Roger Lawrence Esson, Glen Ellyn, and Gordon Heinrich McDonell, Lombard, Ill., assignors to American Can Company, New York, N.Y., a corporation of New Jersey
Filed Dec. 31, 1958, Ser. No. 784,014
8 Claims. (Cl. 99—182)

The present invention pertains to a method of packing a fluid product in a thin walled container and the package produced therefrom. More particularly, it pertains to a method of packing and preserving by means of heat a liquid or semi-liquid food in a thin walled collapsible tube and the package resulting from the method.

With the advent of extremely high altitude airplane travel, especially in military aircraft of the smaller type, a problem has arisen concerning the feeding of the occupants of the aircraft during such high altitude flights. The cabin or cockpit of the smaller aircraft is seldom pressurized whereby at high altitudes, e.g. 50,000 feet and above, the pressure within the cockpit is very substantially below that of the atmosphere at sea level. Pressure equalization on the pilot's body is obtained by special clothing which seals off the pilot's body from the atmosphere surrounding him.

In order to maintain this seal, there can be no enlarged opening in the pilot's attire. This restriction immediately obviates the use of large pieces of food for pilot feeding which would require an enlarged opening in the pilot's attire in order for the food to be transferred to the pilot's mouth.

Because of the above circumstances feeding of aircraft personnel under such circumstances is restricted to liquid or semi-liquid foods which can be transferred from outside the pilot's attire to his mouth through a relatively small diameter tube. Also, the substantially reduced pressure at high altitudes obviates the possibility of the pilot's sucking a liquid or semi-liquid food into his mouth by means of a conventional straw.

It is therefore an object of the instant invention to provide a package from which the product must be readily dispensed at very high altitudes.

It is another object to provide a package containing a liquid or semi-liquid food which may be used to feed aircraft personnel at very high altitudes.

Yet another object is to provide a package containing a product of the character described, which product may be readily and neatly dispensed at very high altitudes.

It is also an object of the present invention to provide a method of packaging a preserved liquid or semi-liquid comestible for feeding aircraft personnel at very high altitudes.

Numerous other objects and advantages of the invention will be apparent as it is better understood from the following description which is of a preferred embodiment thereof.

The above objects are achieved by filling a liquid or semi-liquid comestible into a thin walled collapsible tube, closing and hermetically sealing the filled tube in such a manner as to insure a pressure potential inside the tube of substantially zero and heat processing the sealed tube under specific conditions set forth more fully hereinafter.

Referring to the drawing:

FIGS. 1 through 7 schematically illustrate the sequence of steps of the instant method.

By the term "fluid product" as used hereinafter is meant to include both liquid and semi-liquid materials.

The tube useful in the present invention must be easily collapsible, unaffected by fluid products and immersion in liquid and impervious to the passage of liquids and gases through the walls thereof. Since the present invention is primarily directed towards a food package, which food must be subjected to heat for its preservation, the material from which the tube is constructed must not be adversely affected by elevated temperatures. Thin wall metal tubes made from aluminum and tin best meet all of the above requirements. However, tubes composed of certain synthetic resins such as polyethylene, vinylidene chloride polymers known commercially as "Saran," polyethylene terephthalate known commercially as "Mylar" and the like would be satisfactory as containers for foods which do not require severe heat treatments for their preservation.

A great variety of fluid comestibles can be packaged according to the present invention. Examples of such comestibles are meat products such as chicken, beef, ham, bacon and pork; dairy products such as milk drinks, coffee flavored drinks, cheese, etc.; fruits and juices such as tomato juice, apple sauce, bananas, mixed vegetable juices and the like.

As mentioned previously, the products packed according to the present invention are to be dispensed at high altitudes where the pressure surrounding the tube is substantially less than atmospheric pressure at ground level. Therefore, to avoid bursting of the container and/or violent ejection of the product from the tube upon opening thereof at such elevated altitudes, the pressure within the container must not exceed the external pressure at the elevated altitude. At the same time the package must resist crushing by ground level atmospheric pressure so that the package may be easily handled without the use of special equipment or precautions. These apparently diverse objectives are accomplished by the unique method of the instant invention.

The fluid comestible must be incompressible or substantially so after being packed into the collapsible tube. Liquid products by their very nature are incompressible and therefore need no special treatment to achieve this condition. However, semi-liquid products such as meat paste and the like are first deaerated by means of vacuum to remove substantially all noncondensible gases contained therein. For this deaeration operation a vacuum of 27 inches of mercury has been found satisfactory.

The deaerated fluid product is then packed into the container, care being taken to avoid the presence of void spaces in the product. Substantially all noncondensible gases are removed from the thus packed container and the container is closed and sealed. The gas removal from the container may be accomplished either by vacuumizing the container, e.g. at 27 inches of mercury, prior to and during the closing and sealing operation; or the filled container may be subjected to an atmosphere of superheated steam, e.g. 450° F., prior to and during the closing operation. In the case of metal tubes as the container, sealing is accomplished by providing the inner surface of the tube immediately adjacent its open end with a bead of thermoplastic cement or adhesive. Upon closing the tube this cement is heated to a fluid state, the open end of the tube pinched together with the thermoplastic adhesive in intimate contact with the contiguous metal surfaces and thereafter the end of the tube is rolled or folded down onto the product. If a plastic tube is used it is necessary merely to pinch the open end of the tube together immediately adjacent the product and heat seal the contiguous surfaces. In the closing and sealing operation it is absolutely essential that the open end of the tube be closed in such a manner as to eliminate substantially all void spaces between the product and the closure. If such a requirement is not met crushing and deformation of the tube will result due to the pressure differential between the inside and outside of the tube. Compliance with this requirement prevents such crushing or deformation since the thin wall of the collapsible tube is supported by the incompressible product contained therein.

Although no voids exist within the closed and sealed container, the container is not filled to its potentially maximum internal volume at this time. This result is achieved by providing a relatively long taper in the tube between its flat, sealed end and the tubular or cylindrical portion of the body. This permits expansion, if any, of the incompressible product during the heating operation without rupturing the tube by having the expanding product force this tapered portion outwardly, thereby increasing the length of the tubular or cylindrical portion of the tube and correspondingly decreasing the length of the tapered portion.

After closing and sealing, the filled tube is subjected to heat to preserve the packed product. This heat treatment may be a relatively mild pasteurization process such as when the contents of the tube are a dairy product or the like; or it may be a more severe sterilization and cooking process in the case of meat products and the like. For pasteurization, subjecting the filled tube to processing temperatures in the range of 150 to 212° F. for a few minutes is satisfactory. For the more severe sterilization and cooking treatment, the filled tube is subjected to temperatures between 212° F. and 250° F., for between one half to two hours, preferably 60 to 90 minutes.

Due to the substantially complete removal of noncondensible gases both from the packed product and the container and the elimination of void spaces within the container, at temperatures below 212° F. there is present in the container a pressure potential of substantially zero, i.e., the internal pressure of the container is equal to but never exceeds the external pressure on the container. Since there is some water present within the container, at least in the packed product, there will always be present within the container a pressure equal to the vapor pressure of this water. This water vapor pressure will never exceed sea level atmospheric pressure, i.e. 760 mm. of mercury, at temperature below 212° F. As presently contemplated, the only time during which the package will be subjected to temperatures of 212° F. or more is during the sterilization and cooking process mentioned above.

To obviate any tendency of the sealed package to explode or burst during high temperature heat treatment, the filled and sealed tube is heat processed under an external pressure substantially equal to the internal pressure that would be generated under the temperature existing within the container during the heat treatment. If atmospheric pressure is insufficient to provide the external pressure to prevent bursting of the tube, additional superimposed pressure is utilized. For example, for the heat processing of semi-solid chicken, the filled container is subjected to 230° F. for 80 minutes. The significant internal pressure of the container under these conditions would be the vapor pressure of water at 230° F., which is equal to approximately 1075 mm. of mercury. Therefore, to prevent bursting under such conditions, the tube is subjected to a total pressure, i.e. atmospheric pressure plus superimposed pressure supplied from another source such as compressed air, of at least 1075 mm. of mercury. Total external pressures in excess of 1075 mm. of mercury would produce no harmful effect since collapsing of the tube would be prevented by its being supported by the incompressible product contained therein. For milder heat treatment, such as pasteurization, where the temperature within the tube does not exceed 212° F., no special provisions for superimposed pressure are necessary since normal sea level atmospheric pressure is sufficient to prevent bursting of the tube. However, as a general rule it can be said that in any heat treatment of the filled and sealed tube the external pressure surrounding the tube must be substantially equal to the internal pressure generated within the tube by virtue of the heat treatment.

After the heat treatment, the tubes are then cooled to room temperature. Such cooling is usually accomplished by immersion of the heated tube in cold water. However, other means such as water spraying, refrigeration and the like may be used if desired. In any event, transfer of heat out of the tube is not an instantaneous process. Therefore, during at least the initial stages of this cooling operation when the internal pressure on the tube is the same as or substantially the same as that existing during the heat treatment, the tubes must be cooled under total external pressure at least equal to the internal pressure of the tube to prevent bursting of the tube. In the case of tubes heat processed at temperatures above 212° F., superimposed pressure must be used at least until the temperature within the tube falls below 212° F. Also, as in the case with milder heat treatment, such as pasteurization, the total external pressure during cooling may be merely atmospheric. In general, as with the heating, the external pressure surrounding the tube during cooling must be at least equal to the internal pressure of the tube resulting from the temperature within the tube. After the cooling operation, the tubes and the product packed therein are ready for their ultimate use.

The drawing illustrates the sequence of steps in the preferred method of carrying out the subject invention showing simple apparatus for carrying out these steps. A collapsible metal tube generally designated 10 has a closed end wall 11 and is open at its opposite end 12. Surrounding the open end 12 on the inside surface of the tube is a band of adhesive 13. A comestible 14 is filled into the tube 10 by any suitable means, such as through a nozzle 15, to a point below the band of adhesive 13. The nozzle 15 is then withdrawn and the open end 12 is placed within a chamber 16, which chamber is connected to a source of vacuum through a suitable conduit such as 17. A vacuum is then drawn on the chamber 16 whereby the non-condensible gases present within the tube and product are removed.

While the interior of the tube and its contents are maintained under vacuum the open end 12 is closed by pressing opposite sides thereof together such as by reciprocating members 18 and 19. The adhesive 13 may be of the pressure sensitive type so that the pinching of the open end 12 bringing the adhesively coated surface in face-to-face relation seals the closed end of the tube; or the adhesive may be of the hot-melt type whereby the application of heat activates the adhesive so that upon closing the end of the tube an adhesive seal is produced.

After it has been adhesively sealed, the tube end is folded down upon itself by any suitable means, such as the reciprocating fingers 20 shown in FIGS. 4 and 5. As best shown in FIG. 6 the sealed end of the tube 10 is folded down upon the product 14 so as to remove substantially all void spaces within the tube.

The thus filled and sealed tube is then placed in a suitable cooking or pasteurizing vessel generally designated 21. The top 22 of the vessel 21 is removably secured to the side walls 23 thereof to provide a means of ingress and egress of the filled and sealed tube. After the tube has been situated within the vessel 21 and the top 22 secured in place, it is heated either to pasteurize or to cook the comestible 14. As illustrated in FIG. 6 this heating is accomplished by immersing the tube 10 in a heat conducting fluid medium 24, such as water, supplied to the interior of the vessel 21 through a conduit 25 which fluid may be subsequently removed through conduit 26. The fluid 24 is heated by any suitable means such as gas flames 27 emanating from a perforated conduit 28. As the temperature within the tube 10 increases its internal pressure also increases. To equalize the pressure on the walls of the tube 10 as this internal pressure increases, the pressure within the vessel 21 is increased such as supplying compressed air thereto through the conduit 29.

After the comestible 14 has been heat treated for a sufficient length of time, the tube and its contents are cooled. As shown in FIG. 7 this may be accomplished by turning off the flames 27 and replacing the heating fluid 24 with a cooling fluid, e.g. cold water, 30 by circulating the fluid 30 through the conduits 25 and 26. During this cooling period external pressure is maintained on the walls of the tube 10 through the conduit 29 to equal the internal pressure on the tube 10 generated by the hot product therein. When the contents of the tube have been cooled to something less than to 212° F., i.e. cooled to a point where the pressure within the tube is less than one atmosphere, the need for external pressure on the tube is no longer necessary. Thereafter the vessel 21 is opened and the tube removed for subsequent packing and shipment.

The following examples describe specific embodiments of the instant invention but are not to be construed as limitations thereof.

In each of the following examples the container is a cylindrical thin-walled aluminum tube 1⅜" in diameter and 4¾" long, being open at its bottom end and having a perforatable seal at its opposite end. The sealed end is surrounded by a threaded nozzle of substantially reduced diameter from that of the major portion of the tube, which nozzle is connected to the body of the tube by means of a tapered shoulder. This construction is conventional and well-known in the art. Immediately adjacent the circular open end of the tube, around the entire inside circumference of the tube is a bead of thermoplastic cement.

*Example 1*

A dairy product comprising milk solids and chocolate and having the flavor and consistency of chocolate syrup was deaerated in a vacuum of 27" of mercury. The product was heated to a temperature of 160° F., filled into the tube at this temperature and closed in an atmosphere of superheated steam at 450° F. which steam removed the noncondensible gases, i.e. head space air, from the tube. The temperature caused by the superheated steam was sufficient to soften the thermoplastic cement so that when the open end of the tube was crimped or pinched together this cement adhered together the contiguous metal surfaces and formed a seal therebetween. Immediately following closure, the crimped ends of the tube were folded down onto the product to complete the seal and to eliminate voids within the tube. The filled and sealed tubes were then immersed in boiling water until the packed product has been maintained at 180° F. for three minutes. Thereafter, the product was cooled by immersion in cold water. No superimposed pressure was used either during the heat treatment or cooling operation.

*Example 2*

V-8 vegetable juice was packed, filled and processed under the same process as the chocolate product in Example 1, except that the product was not deaerated prior to filling since, being a liquid, no voids existed within the product.

*Example 3*

Applesauce was filled and processed in exactly the same manner as the V-8 juice of Example 2.

*Example 4*

A liquid chicken product was prepared by pureeing the meat of chicken and forming a slurry thereof. This product was deaerated under 27" of vacuum and homogenized at 110° F. The heated, homogenized product was filled into the tube in an atmosphere of superheated steam, closed and sealed in a manner identical with the chocolate drink set forth in Example 1. The closed and filled tube was heat processed for 85 minutes at 231° F., under superatmospheric or superimposed pressure followed by immersion in cold water for one minute, also under superatmospheric pressure, to cool the tube and its contents.

*Example 5*

A comestible consisting essentially of cheese and bacon was deaerated under 27" of vacuum, heated to 160° F. and filled into the tube at this temperature in an atmosphere of superheated steam at 450° F. Thereafter, the tube was closed while in the superheated steam atmosphere and sealed. The packed product was then pasturized in the same manner as was the chocolate product in Example 1.

Over 1,000 tubes were packed with the products of and according to the methods set forth in the above examples. Of this great number of samples only one tube containing applesauce leaked due to two small pinholes within the body of the tube. All of the other tubes readily withstood 27" of vacuum, equivalent to an altitude of 50,000 feet, with very little or no expansion. The keeping quality and flavor of the products packed according to the examples were considered very satisfactory.

It is thought that the invention and many of its attendant advantages will be understood from the foregoing description, and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred embodiment thereof.

We claim:

1. A method of packaging a comestible within a thin walled, self-supporting, collapsible metal tube comprising providing a collapsible tube having a sealed dispensing opening at one end and being open at its opposite end, said tube having a film of adhesive on its inside surface adjacent said open end, filling said tube through said open end with a substantially incompressible fluid comestible to less than the potentially maximum internal volume of said tube, removing from the filled tube substantially all non-condensible gas, pinching flat said open end with said adhesive disposed between the opposed flat surfaces of said pinched end to adhesively bond said surfaces together and to hermetically seal the thus degassed tube, folding said bonded and sealed end toward said comestible to eliminate substantially all voids within the sealed tube, heating the folded tube and the comestible therein to an elevated temperature to prolonge the storage life of said comestible, and cooling said folded tube and comestible, said folded tube being maintained under an external pressure at least substantially equal to its internal pressure during and between said heating and cooling to prevent bursting of said tube due to said internal pressure.

2. The method set forth in claim 1 wherein said fluid product is subjected to vacuum prior to filling into said tube to remove substantially all noncondensible gas therefrom.

3. The method set forth in claim 1 wherein the filled tube is subjected to vacuum to remove substantially all noncondensible gas therefrom.

4. The method set forth in claim 1 wherein the filled tube is closed in an atmosphere of superheated steam to remove substantially all noncondensible gas from said tube.

5. The method set forth in claim 1 wherein said closed and sealed tube is heated to a temperature above 212° F. to cook said product within said tube.

6. The method set forth in claim 1 wherein said external pressure is greater than atmospheric.

7. The method set forth in claim 1 wherein said closed tube is heated to a temperature between 150° F. and 212° F. to pasteurize said product within said tube.

8. The method set forth in claim 1 wherein said external pressure is atmospheric.

References Cited in the file of this patent
UNITED STATES PATENTS

| | | |
|---|---|---|
| 2,380,134 | Waters | July 10, 1945 |
| 2,401,131 | Bensel | May 28, 1946 |
| 2,430,995 | Roos | Nov. 18, 1947 |
| 2,477,692 | Grinrod | Aug. 2, 1949 |
| 2,575,863 | Clifcorn | Nov. 20, 1951 |
| 2,669,351 | Carson et al. | Feb. 16, 1954 |
| 2,690,970 | Moses | Oct. 5, 1954 |
| 2,748,005 | Baier | May 29, 1956 |